(12) United States Patent
Shiga et al.

(10) Patent No.: US 6,443,304 B1
(45) Date of Patent: Sep. 3, 2002

(54) CASSETTE CONTAINER

(75) Inventors: Hideaki Shiga; Yusuke Ishihara, both of Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 6 days.

(21) Appl. No.: 09/704,677

(22) Filed: Nov. 3, 2000

(30) Foreign Application Priority Data

Nov. 4, 1999 (JP) .............................. 11-313549

(51) Int. Cl.[7] .................. B65D 85/575; B65D 43/14
(52) U.S. Cl. ................ 206/387.1; 206/387.13; 220/833
(58) Field of Search .................. 206/387.1, 387.13, 206/472; 220/835, 834, 833

(56) References Cited

U.S. PATENT DOCUMENTS

| | | |
|---|---|---|
| 3,851,789 A | 12/1974 | Case et al. |
| 4,011,940 A | 3/1977 | Neal et al. |
| 4,291,801 A | 9/1981 | Basili et al. |
| 4,365,711 A | 12/1982 | Long et al. |
| 4,708,239 A | * 11/1987 | Bourbon .................. 206/387.1 |
| 5,605,227 A | * 2/1997 | Morita .................... 206/387.1 |
| 5,630,508 A | * 5/1997 | Petit ...................... 206/387.1 |
| 5,752,615 A | * 5/1998 | Hofmann et al. ........... 220/835 |
| 5,899,330 A | * 5/1999 | Sato et al. ............. 206/387.13 |
| 5,913,420 A | 6/1999 | Morita |

FOREIGN PATENT DOCUMENTS

| | | |
|---|---|---|
| DE | 30 27 024 A1 | 2/1982 |
| DE | 89 14 149 | 2/1990 |
| EP | 0 892 405 A2 | 1/1999 |
| GB | 2 101 970 A | 1/1983 |

* cited by examiner

Primary Examiner—Bryon P. Gehman
(74) Attorney, Agent, or Firm—Sughrue Mion, PLLC

(57) ABSTRACT

A cassette container includes a container body having side walls and a lid member which is connected to the container body by way of a thin hinge portion to be rotatable about the hinge portion to close and open the container body and is provided with side walls which are fitted in or on the side walls on the container body when the lid member is closed. The side walls of the container body are provided with a pair of guide ribs having inclined surfaces which are adapted to abut against the side walls of the lid member when the lid member is closed and to guide the side walls of the lid member so that the side walls on the lid member are fitted in or on the side walls on the container body.

9 Claims, 1 Drawing Sheet

CASSETTE CONTAINER

BACKGROUND OF THE INVENTION

1. Field of the Invention

This invention relates to a cassette container for containing therein, for instance, a magnetic tape cassette (sometimes called "magnetic tape cartridge") comprising a cassette casing and a single reel which is housed in the cassette casing for rotation and around which a magnetic tape is wound.

2. Description of the Related Art

As a backup medium for a computer memory, there have been known a magnetic tape cassette comprising a thin rectangular cassette casing and a single reel which is housed in the cassette casing for rotation and around which a magnetic tape is wound, a magnetic disc cassette comprising a thin rectangular cassette casing and a magnetic disc housed in the cassette casing for rotation, and the like.

Those cassettes are generally contained in a cassette container when they are transported or stored. The cassette container is formed of polypropylene having certain extent of flexibility and comprises a container body open upward and a lid member which is connected to one edge of the container body by way of a thin hinge portion to be rotatable about the hinge portion to open and close the container body. The lid member is provided with side walls which are fitted in or on side walls formed on the container body when the lid member is closed.

The side walls on the container body or the lid member are sometimes formed only halfway of the side edges of the container body or the lid member from which the side walls are erected. When the side walls are formed in such a state, the side walls can be deformed e.g., can be warped, when the container is released from the mold, just after the mold release or when the molded container is stored. When the side walls are deformed, the side walls of the lid member can interfere with the side walls of the container body to prevent closure of the lid member. The side walls are more apt to be deformed when the container is formed of polypropylene and when the side walls are high.

That is, when opposite ends of the side walls are connected to the walls of the container body or the lid member which extend in perpendicular to the side walls, the side walls are less apt to be deformed. However when at least one of the ends of each side wall is free, the side walls are apt to be deformed when the molded containers at an elevated temperature are cooled or during storage of the containers depending upon the environmental conditions.

SUMMARY OF THE INVENTION

In view of the foregoing observations and description, the primary object of the present invention is to provide a cassette container which can suppress deformation of the side walls and prevent interference of the side walls of the lid member with the side walls of the container body upon opening and closure of the lid member.

In accordance with the present invention, there is provided a cassette container comprising a container body having side walls and a lid member which is connected to the container body by way of a thin hinge portion to be rotatable about the hinge portion to close and open the container body and is provided with side walls which are fitted in or on the side walls on the container body when the lid member is closed, wherein the improvement comprises that a pair of guide ribs having inclined surfaces which are adapted to abut against the side walls of the lid member when the lid member is closed and to guide the side walls of the lid member so that the side walls of the lid member are fitted outward of the side walls of the container body.

In the cassette container in accordance with the present invention, deformation of the side walls of the lid member can be suppressed and the lid member can be smoothly opened and closed, and at the same time, the strength to drop impact of the cassette container can be increased by providing, on the side walls of the container body, guide ribs having inclined surfaces which are adapted to abut against the side walls of the lid member when the lid member is closed and to guide the side walls of the lid member so that the side walls on the lid member are fitted in or on the side walls on the container body.

DESCRIPTION OF THE PREFERRED EMBODIMENT

Figure 1:
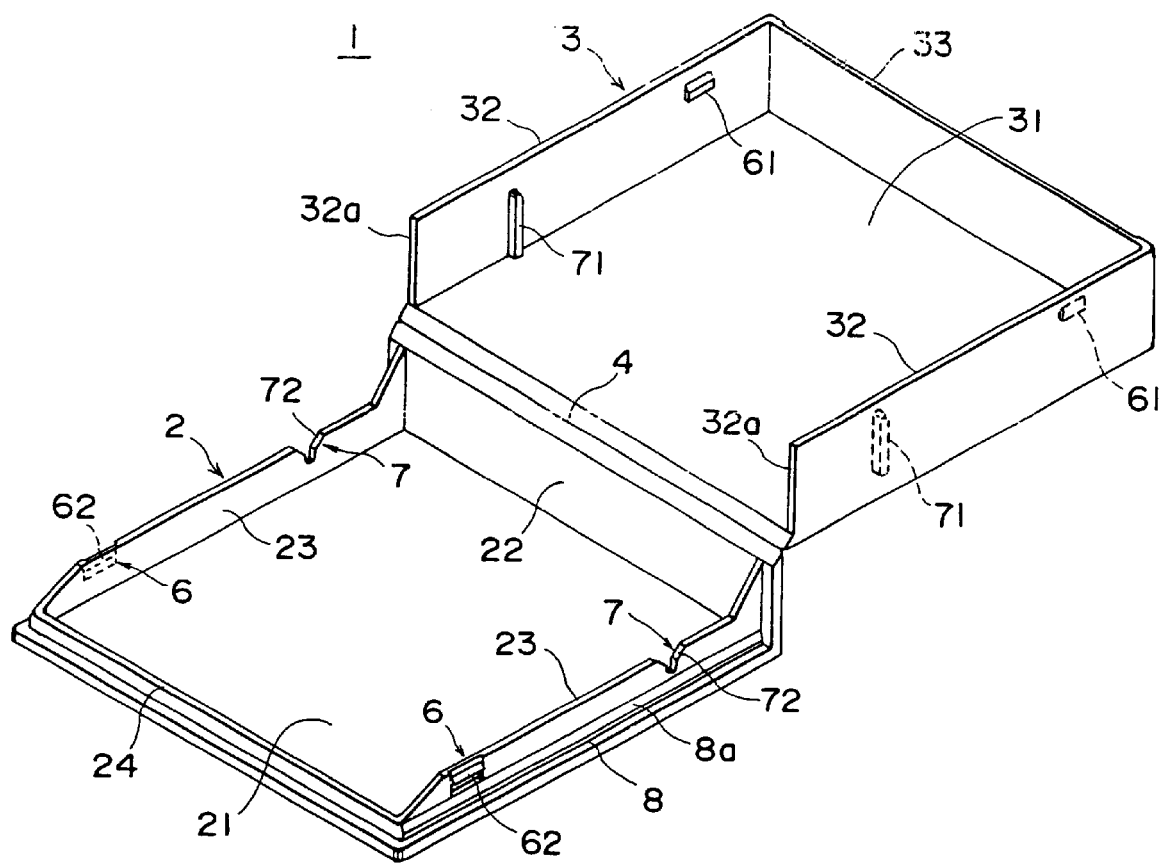
FIG. 1 is a perspective showing a cassette container in accordance with an embodiment of the present invention in a state where the lid member is opened.
Figure 2:
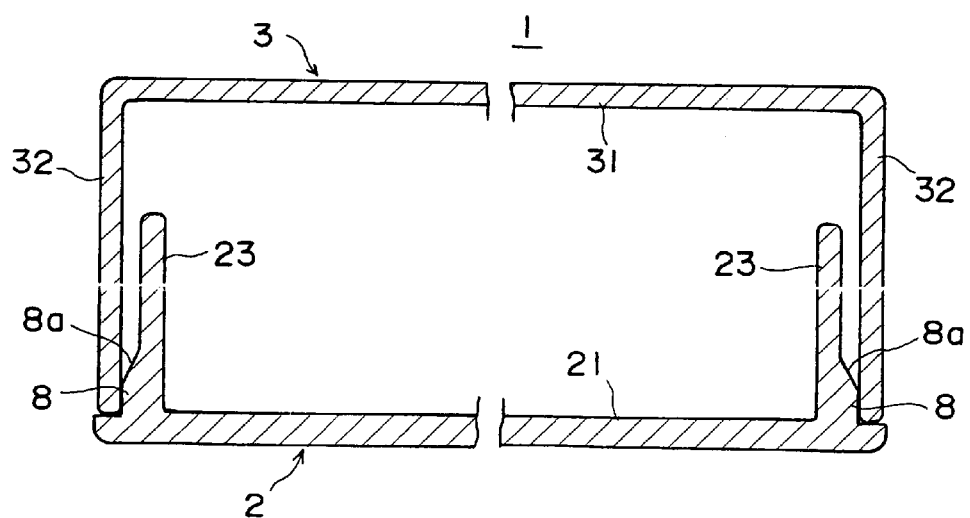
FIG. 2 is a cross-sectional view showing the cassette container in a state where the lid member is closed.

In FIGS. 1 and 2, a cassette container 1 in accordance with an embodiment of the present invention comprises a container body 2 and a lid member 3 connected to a thin hinge portion 4 to be rotatable about the hinge portion 4 to open and close the container body 2. A cassette such as a magnetic tape cassette is contained in the container 1. The cassette body 2 and the lid member 3 are integrally formed by molding of resin such as polypropylene with the lid member 3 opened as shown in FIG. 1.

The container body 2 comprises a bottom plate 21, a back wall 22 erected from the rear end of the bottom plate 21, a front wall 24 erected from the front end of the bottom plate 21 at a slight distance from the front end of the bottom plate 21 toward the back wall 22, and left and right side walls 23 erected from the side edges of the bottom plate 21. The front wall 24 is relatively low in height and the side walls 23 become lower toward the front wall 24. The walls 22 to 24 form a space in which the cassette is contained.

The lid member 3 comprises a top plate 31 which is connected to the upper edge of the back wall 22 of the container body 2 at the rear end thereof by way of the thin hinge portion 4, a front wall 33 erected from the top plate 31 at the front end thereof and left and right side walls 32 erected from the side edges of the top plate 31. The rear ends 32a of the side walls 32 are free ends.

When the lid member 3 is closed, the side walls 32 and the front wall 33 of the lid member 3 are fitted on the outer sides of side walls 23 and the front wall 24 of the container body 2. In the closed state of the lid member 3, the ends of the side walls 32 and the front wall 33 of the lid member 33 abut against the upper surface of the bottom plate 21 of the container body 2 with the top plate 31 of the lid member 3 and the bottom plate 21 of the container body 2 positioned substantially in parallel to each other. The front wall 33 of the lid member 3 is formed with a recess so that a front end portion of bottom plate 21 of the container body 2 projects from the front surface of the front wall 33 of the lid member 3 in the closed state of the lid member 3 and a finger of the user is applied to the projecting front end portion of the bottom plate 21 to open the lid member 3.

The lid member 3 is locked in the closed position by a locking means 6. The locking means 6 comprises engagement recesses 62 formed on the outer sides of the side walls 23 of the container body 2 near the front end of the container body 2, and projections 61 formed on the inner sides of the side walls 32 of the lid member 3. The projections 61 on the lid member 3 are engaged with the engagement recesses 62 on the container body 2 when the lid member 3 is closed and lock the lid member 3 in the closed position. Further the cassette container 1 of this embodiment is provided with a locator means 7 comprising a pair of ribs 71 which are formed on the inner sides of the side walls 32 of the lid member 3 to extend in the direction of thickness of the container 1 and a pair of notches 72 formed on the side walls 23 of the container body 2 from the upper surfaces of the side walls 23. As the lid member 3 is closed, the ribs 71 are brought into contact with the inclined surfaces of the notches 72 nearer to the hinge portion 4, slide along the inclined surface and finally are pressed against the inclined surface of the notches 72 remote from the hinge portion 4, whereby the lid member 3 is located relative to the container body 2 and is locked there.

As shown in FIG. 2, a guide rib 8 extends along the lowermost portion of each side wall 23 of the container body 2. The guide rib 8 has an inclined surface 8a inclined outward downward. When the lid member 3 is closed, the ends of the side walls 32 of the lid member 3 adapted to be brought into abutment against the inclined surfaces 8a of the guide ribs 8. The end portions of the side walls 23 of the container body 2 and the side walls 32 of the lid member 3 are chamfered.

That is, when the lid member 3 is rotated about the hinge portion 4 toward the container body 2, the side walls 32 of the lid member 3 are fitted on the outer surfaces of the side walls 23 of the container body 2 and as the lid member 3 is further rotated toward the container body 2, the end portions of the side walls 32 of the lid member 3 are brought into abutment against the inclined surfaces of the guide ribs 8, whereby the side walls 32 are expanded outward and guided to the regular position. When the side walls 32 have not been deformed and in a predetermined dimensional accuracy, the end portions of the side walls 32 can be moved to the regular position without contacting the inclined surfaces of the guide ribs 8.

Inward deformation of the side walls 32 is suppressed by the guide ribs 8 in the closed state of the lid member 3. Especially, when the container 1 is stored with the lid member 3 closed just after molding of the container 1, inward deformation of the side walls 32 is suppressed and corrected by the guide rib 8, whereby when the lid member 3 is subsequently opened and closed, interference of the side walls 32 of the lid member 3 with the side walls 23 of the container body 2 is prevented.

As can be understood from the description above, by providing a guide rib 8 having outward downward inclining surface on the lower portion of the outer side of each side wall 23 of the container body 2, deformation of the side walls 32 of the lid member 3 can be suppressed and the lid member 3 can be smoothly opened and closed. Further, the strength to drop impact of the cassette container can be increased.

In addition, all of the contents of Japanese Patent Application No. 11(1999)-313549 are incorporated into this specification by reference.

What is claimed is:

1. A cassette container comprising:
   a container body having side walls and a lid member which is connected to the container body by way of a thin hinge portion to be rotatable about the hinge portion to close and open the container body and is provided with side walls which are fitted in or on the side walls on the container body when the lid member is closed, wherein the improvement comprises:
   a pair of guide ribs positioned on outer surfaces of the side walls of the container body, wherein the guide ribs have inclined surfaces which outwardly project from the side walls in a direction normal to the side walls, the inclined surfaces being adapted to guide and outwardly expand the side walls of the lid member and maintain the outward expansion of the lid member when the lid member is in a closed state.

2. The cassette container as defined in claim 1, wherein the container body and the lid member are integrally formed by molding of a resin with the lid member opened.

3. The cassette container as defined in claim 1, wherein the container body comprises a bottom plate, a back wall erected from the rear end of the bottom plate, a front wall erected from the front end of the bottom plate at a slight distance from the front end of the bottom plate toward the back wall, and left and right side walls erected from the side edges of the bottom plate, the front wall being relatively low in height and the side walls becoming lower toward the front wall.

4. The cassette container as defined in claim 3, wherein the lid member comprises a top plate which is connected to the upper edge of the back wall of the container body at the rear end thereof by way of the thin hinge portion.

5. The cassette container according to claim 1, wherein the guide ribs extend along a whole length of the side walls of the container body.

6. A cassette container comprising:
   a container body having side walls;
   a lid member having side walls;
   a hinge portion connecting said container body and said lid member,
   wherein said lid member is rotatable about said hinge portion to open and close the container body,
   wherein said side walls of said lid member are disposed adjacent to outer surfaces of said side walls of said container body when said lid member is closed, and
   at least one guide rib formed on the lowermost portion of said outer surfaces of said side walls of said container body,
   wherein said at least one guide rib comprises an inclined surface, whereby said lowermost portion of said side wall of said container body is wider than a top portion of said side wall of said container body.

7. The cassette container according to claim 6, wherein end portions of said side walls of said lid member contact said inclined surface of said at least one guide rib when said lid member is closed.

8. The cassette container according to claim 7, wherein said at least one guide rib urges said side walls of said lid member in an outward direction when said lid member is closed.

9. The cassette container according to claim 6, wherein said at least one guide rib extends along a whole length of said side walls of said container body.

* * * * *